United States Patent
Karube et al.

(10) Patent No.: US 11,657,197 B2
(45) Date of Patent: May 23, 2023

(54) SUPPORT SYSTEM AND COMPUTER READABLE MEDIUM

(71) Applicant: Mitsubishi Electric Corporation, Tokyo (JP)

(72) Inventors: Fumitoshi Karube, Tokyo (JP); Yoshihiro Ogawa, Tokyo (JP); Ryo Yamamoto, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/705,710

(22) Filed: Mar. 28, 2022

(65) Prior Publication Data
US 2022/0222405 A1 Jul. 14, 2022

Related U.S. Application Data

(63) Continuation of application No. PCT/JP2019/045283, filed on Nov. 19, 2019.

(51) Int. Cl.
*G06F 30/327* (2020.01)
*G06F 30/27* (2020.01)
(Continued)

(52) U.S. Cl.
CPC .......... *G06F 30/327* (2020.01); *G06F 30/27* (2020.01); *G06F 2117/08* (2020.01); *G06F 2119/12* (2020.01)

(58) Field of Classification Search
CPC .... G06F 30/327; G06F 30/27; G06F 2117/08; G06F 2119/12; G06F 8/20
See application file for complete search history.

(56) References Cited

U.S. PATENT DOCUMENTS 6,513,146 B1 1/2003 Yonezawa et al.
8,893,080 B2 * 11/2014 Von Platen ........... G06F 9/4494
717/111
(Continued)

FOREIGN PATENT DOCUMENTS

JP  9-81604 A   3/1997
JP  11-259553 A 9/1999
(Continued)

OTHER PUBLICATIONS

"COSYN: Hardware-Software Co-Synthesis of Embedded Systems", Bharat P. Dave, Ganesh Lakshminarayana, Niraj K. Jha, DAC 1997.*
(Continued)

*Primary Examiner* — Nha T Nguyen
(74) *Attorney, Agent, or Firm* — Birch, Stewart, Kolasch & Birch, LLP

(57) ABSTRACT

A software studying unit (122) calculates software processing time of each of a plurality of functions in a target source program. A data-flow graph generation unit (121) generates an inter-function data-flow graph of the plurality of functions based on the target source program. A hardware studying unit (130) calculates hardware processing time of each function and a circuit scale of each function by a high-level synthesis for the target source program. An implementation combination selection unit (140) selects, based on the software processing time of each function, the hardware processing time of each function, the circuit scale of each function, and the inter-function data-flow graph, an implementation combination of one or more functions to be implemented by software and one or more functions to be implemented by hardware.

9 Claims, 13 Drawing Sheets

(51) Int. Cl.
*G06F 117/08* (2020.01)
*G06F 119/12* (2020.01)

(56) References Cited

U.S. PATENT DOCUMENTS

| | | | | |
|---|---|---|---|---|
| 8,949,809 | B2* | 2/2015 | Varma | G06F 8/452 |
| | | | | 717/161 |
| 9,262,305 | B1* | 2/2016 | Wilmot | G06F 30/33 |
| 9,529,587 | B2* | 12/2016 | Voss | G06F 8/72 |
| 10,255,400 | B1* | 4/2019 | Villarreal | G06F 30/327 |
| 10,331,836 | B1* | 6/2019 | Hosangadi | G06F 30/30 |
| 10,372,429 | B2* | 8/2019 | Wang | G06F 9/4498 |
| 10,628,212 | B2* | 4/2020 | Bradshaw | G06F 9/3885 |
| 10,628,286 | B1* | 4/2020 | Iyer | G06F 11/3612 |
| 11,113,030 | B1* | 9/2021 | Monga | G06F 8/10 |
| 11,354,473 | B1* | 6/2022 | Ziglar | G06F 8/20 |
| 2002/0059554 | A1 | 5/2002 | Takemura | |
| 2003/0088840 | A1 | 5/2003 | Yonezawa et al. | |
| 2004/0064817 | A1* | 4/2004 | Shibayama | G06F 9/5066 |
| | | | | 718/107 |
| 2004/0243959 | A1 | 12/2004 | Takemura | |
| 2005/0187750 | A1 | 8/2005 | Satoh et al. | |
| 2009/0077545 | A1* | 3/2009 | Silvera | G06F 8/443 |
| | | | | 717/160 |
| 2009/0204380 | A1 | 8/2009 | Kato et al. | |
| 2010/0107174 | A1 | 4/2010 | Suzuki et al. | |
| 2010/0274972 | A1* | 10/2010 | Babayan | G06F 9/3861 |
| | | | | 711/125 |
| 2012/0144376 | A1* | 6/2012 | Van Eijndhoven | G06F 8/456 |
| | | | | 717/146 |
| 2014/0380287 | A1* | 12/2014 | Carrillo | G06F 30/34 |
| | | | | 717/140 |
| 2017/0031806 | A1* | 2/2017 | Purandare | G06F 30/3323 |
| 2019/0042389 | A1 | 2/2019 | Kobayashi | |
| 2019/0087513 | A1* | 3/2019 | Mukherjee | G06F 30/3323 |
| 2020/0034502 | A1 | 1/2020 | Ogawa et al. | |
| 2020/0225921 | A1* | 7/2020 | Pelton | G06F 8/427 |
| 2020/0371787 | A1* | 11/2020 | Gupta | G06F 8/41 |
| 2021/0056241 | A1 | 2/2021 | Murano et al. | |

FOREIGN PATENT DOCUMENTS

| | | |
|---|---|---|
| JP | 2001-142927 A | 5/2001 |
| JP | 2002-157291 A | 5/2002 |
| JP | 2002-269163 A | 9/2002 |
| JP | 2005-242569 A | 9/2005 |
| JP | 2009-163576 A | 7/2009 |
| JP | 2010-108153 A | 5/2010 |
| WO | WO 2017/135219 A1 | 8/2017 |
| WO | WO 2018/066073 A1 | 4/2018 |
| WO | WO 2018/163291 A1 | 9/2018 |
| WO | WO 2019/171464 A1 | 9/2019 |

OTHER PUBLICATIONS

International Search Report, issued in PCT/JP2019/045283, PCT/ISA/210, dated Jan. 21, 2020.
Office Action for JP 2020-516772 dated Jun. 23, 2020.
Yamamoto et al., "A SW/HW Partitioning for Model Based Design—A automated SW/HW partitioning using Matlab/Simulink and C based High Level Synthesis-", The Institute of Electronics Information and Communication Engineers, IEICE Technical Report, VLD2017-113(Feb. 2018), vol. 117, No. 455, p. 145-150, Feb. 2018.
Zhang et al., "Customizable hardware/software partitioning evaluation method using simple high-level synthesis system", The Institute of Electronics Information and Communication Engineers, IEICE Technical Report, vol. 108, No. 105, CAS2008-19, VLD2008-32, SIP2008-53(Jun. 2008), p. 1-6, Jun. 2008.

* cited by examiner

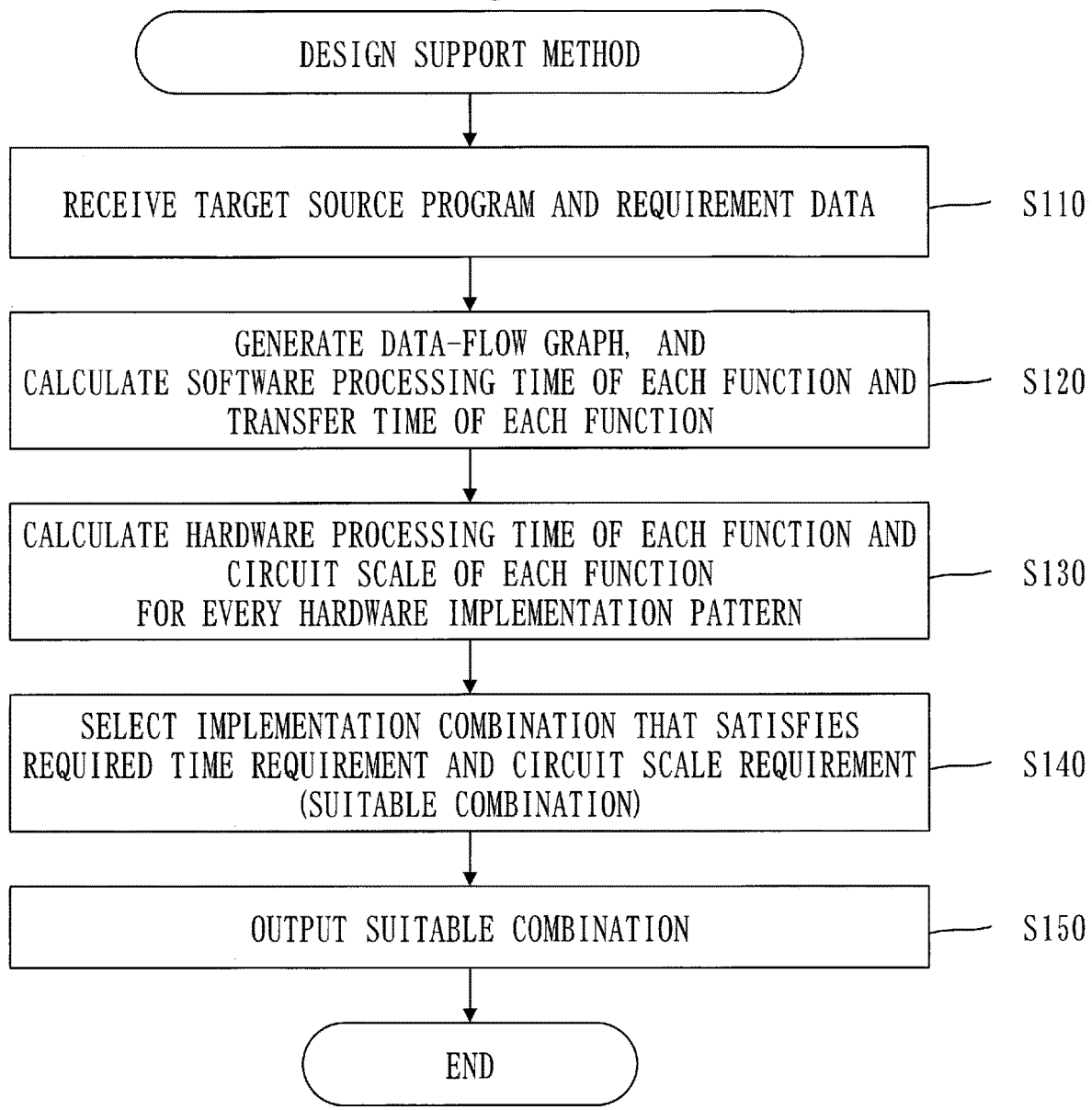

(1)
```
    :
for (i=0; i<100; i++) {
    CALCULATION A;
    CALCULATION X;
}
for (i=0; j<100; j++) {
    CALCULATION A;
    CALCULATION Y;
}
    :
```

(2)
```
    :
for (i=0; i<100; i++) {
    CALCULATION A;
    if (x==1)
        CALCULATION X;
    else
        CALCULATION Y;
}
    :
```

Fig. 12
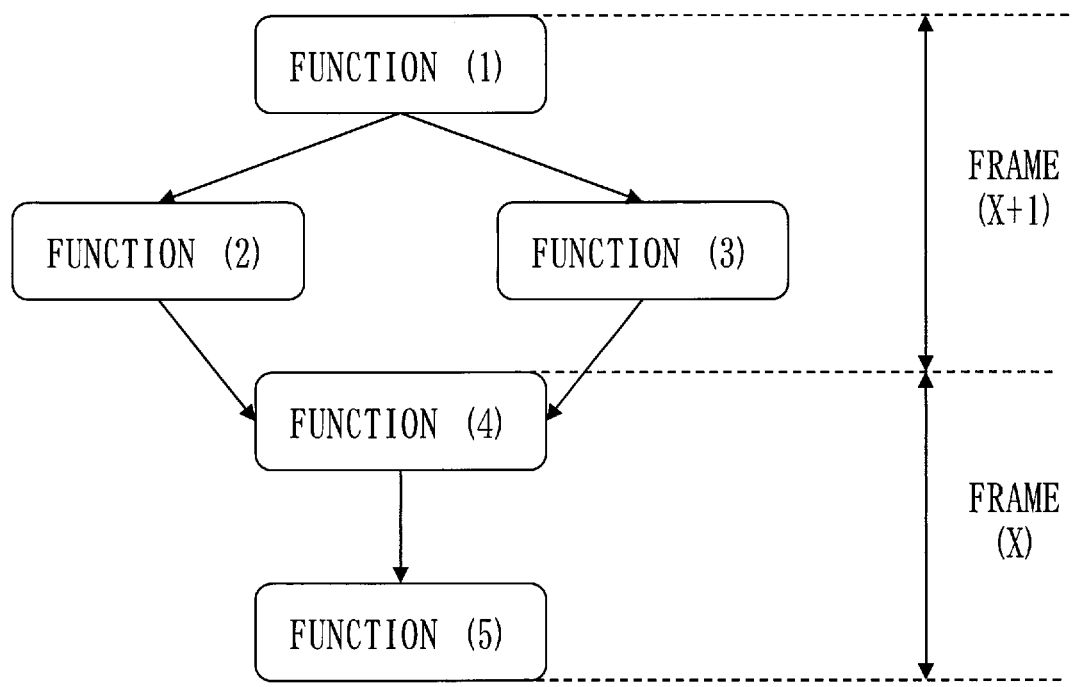
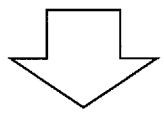
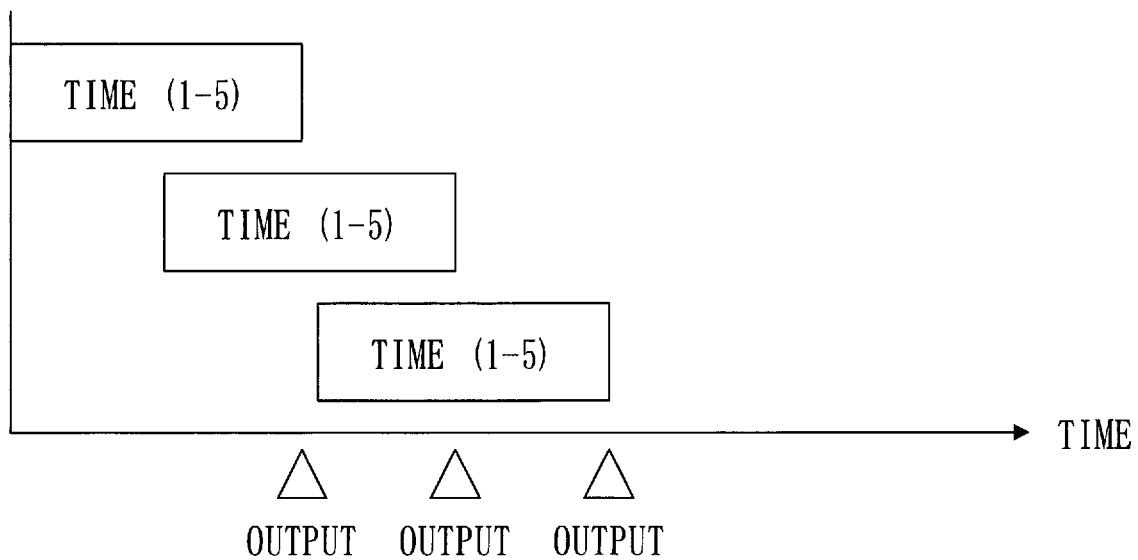

| FUNCTION NAME | THROUGHPUT | FRAME NAME |
|---|---|---|
| FUNCTION (1) | 30 fps | FRAME (X+4) |
| FUNCTION (2) | 30 fps | FRAME (X+3) |
| FUNCTION (3) | 30 fps | FRAME (X+2) |
| FUNCTION (4) | 30 fps | FRAME (X+1) |
| FUNCTION (5) | 30 fps | FRAME (X) |

| FUNCTION NAME | THROUGHPUT | FRAME NAME |
|---|---|---|
| FUNCTION (1) | 30 fps | FRAME (X+3) |
| FUNCTION (2) | 30 fps | FRAME (X+2) |
| FUNCTION (3, 4) | 30 fps | FRAME (X+1) |
| FUNCTION (5) | 30 fps | FRAME (X) |

SUPPORT SYSTEM AND COMPUTER READABLE MEDIUM

CROSS REFERENCE TO RELATED APPLICATIONS

This application is a Continuation of PCT International Application No. PCT/JP2019/045283 filed on Nov. 19, 2019, which is hereby expressly incorporated by reference into the present application.

TECHNICAL FIELD

The present invention relates to technology for supporting system design.

BACKGROUND ART

In development of an embedded system, study with regard to processes to be assigned to software (S/W) and processes to be assigned to hardware (H/W) is conducted based on a requirements specification.

The study such as the above is called "S/W-H/W division".

Typically, hardware is utilized to speed up a process and software is utilized to make a system smaller.

There are vast numbers of combinations of processes to be assigned to software and processes to be assigned to hardware, and it is difficult to manually decide on an appropriate combination. In a case where it is found that the combination that has been selected does not satisfy required performance, the S/W-H/W division is required to be redone.

Therefore, a method to automatically perform the S/W-H/W division quantitatively is in demand.

Technology for S/W-H/W division is disclosed in Patent Literature 1.

CITATION LIST

Patent Literature

Patent Literature 1: WO 2017/135219

SUMMARY OF INVENTION

Technical Problem

The technology in Patent Literature 1 studies every combination and a resource amount used, a communication band, and performance are presented for each combination.

Consequently, a user must decide on an appropriate combination based on information presented.

The present invention aims to enable an appropriate implementation combination of one or more functions to be implemented by software and one or more functions to be implemented by hardware to be presented based on a source program (a target source program) in which operation of a target system is written.

Solution to Problem

A design support system of the present invention includes:
a software studying unit, for a case where each of a plurality of functions in a target source program is to be implemented by software, to calculate software processing time required for execution of each function;
a data-flow graph generation unit to generate, based on the target source program, an inter-function data-flow graph that illustrates a data flow between the functions in the plurality of functions;
a hardware studying unit to calculate hardware processing time required for execution of each function and a circuit scale required for implementation of each function by a high-level synthesis for the target source program; and
an implementation combination selection unit to select, based on the software processing time of each function, the hardware processing time of each function, the circuit scale of each function, and the inter-function data-flow graph, an implementation combination of one or more functions to be implemented by software and one or more functions to be implemented by hardware.

Advantageous Effects of Invention

According to the present invention, with regard to a plurality of functions in a target source program, software processing time of each function, hardware processing time of each function, and a circuit scale of each function are calculated. And, an implementation combination is selected using an inter-function data-flow graph in addition to these pieces of information. The inter-function data-flow graph clarifies dependency between the functions.

Thus, presenting an appropriate implementation combination that is based on the dependency between the functions becomes possible.

BRIEF DESCRIPTION OF DRAWINGS

FIG. 3 is a flowchart of a design support method according to Embodiment 1.

FIG. 4 is a diagram illustrating an example of loop processing according to Embodiment 1.

FIG. 12 is a diagram illustrating an example of a throughput improvement (after an improvement) according to Embodiment 1.

DESCRIPTION OF EMBODIMENTS

Figure 1:
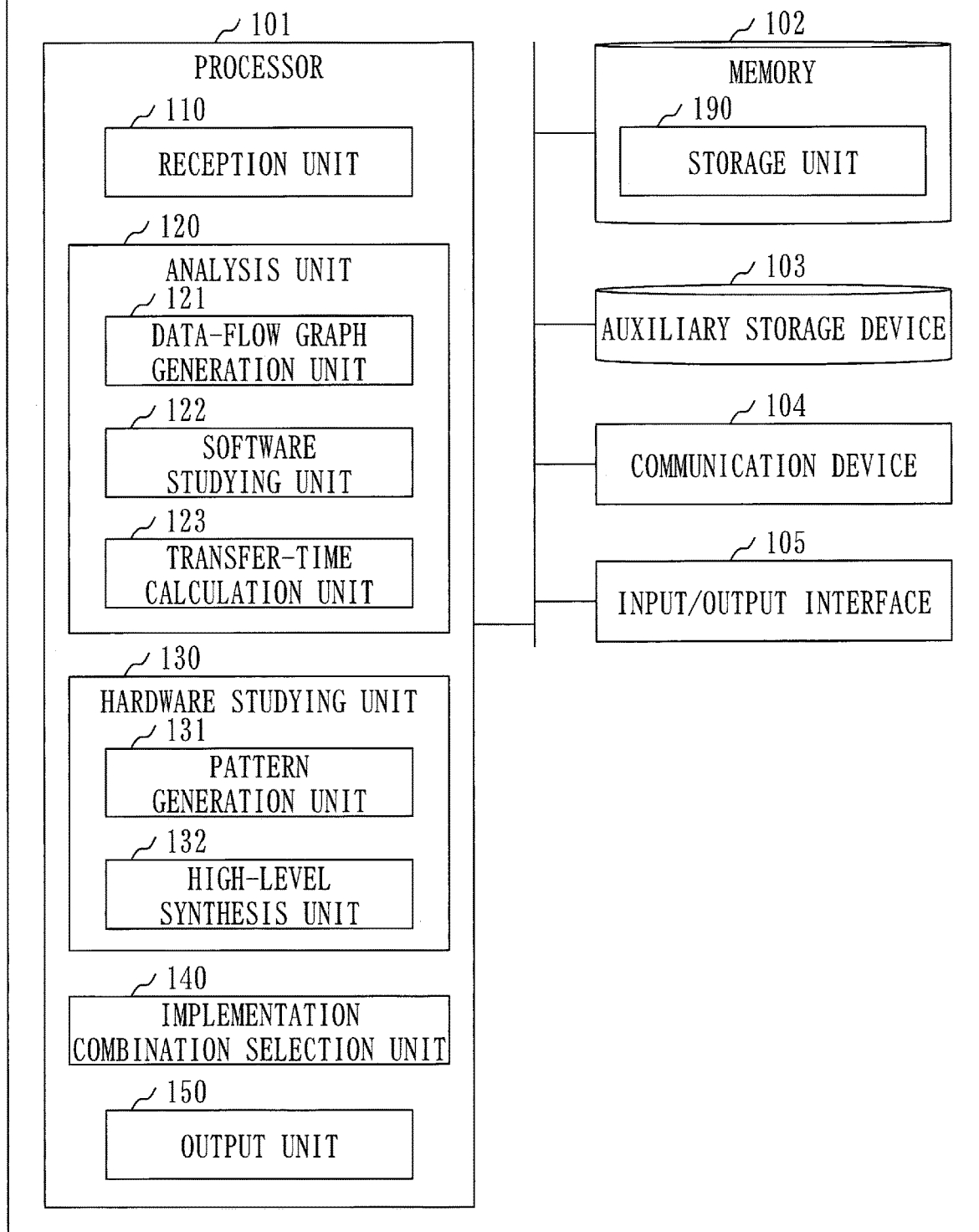
FIG. 1 is a configuration diagram of a design support system 100S according to Embodiment 1.

In the embodiments and in the drawings, the same elements or corresponding elements are denoted by the same reference signs. Description of elements denoted by the same reference signs as the elements described will be suitably omitted or simplified. Arrows in the drawings mainly indicate flows of data or flows of processes.

Embodiment 1

A design support system 100S that supports system design will be described based on FIG. 1 to FIG. 13.

*Description of Configuration*

A configuration of the design support system 100S will be described based on FIG. 1.

The design support system 100S is realized by a design support device 100.

The design support system 100S, however, may be realized by a plurality of devices. That is, functionalities of the design support device 100 may be realized by a plurality of devices.

The design support device 100 is a computer that includes hardware such as a processor 101, a memory 102, an auxiliary storage device 103, a communication device 104, and an input/output interface 105. These hardware are connected to each other via signal lines.

The processor 101 is an IC that performs a calculation process and controls other hardware. For example, the processor 101 is a CPU, a DSP, or a GPU.

IC is an abbreviated name for Integrated Circuit.

CPU is an abbreviated name for Central Processing Unit.

DSP is an abbreviated name for Digital Signal Processor.

GPU is an abbreviated name for Graphics Processing Unit.

The memory 102 is a volatile storage or a non-volatile storage device. The memory 102 is also called a main storage device or a main memory. For example, the memory 102 is a RAM. Data stored in the memory 102 is saved in the auxiliary storage device 103 as necessary.

RAM is an abbreviated name for Random Access Memory.

The auxiliary storage device 103 is a non-volatile storage device. For example, the auxiliary storage device 103 is a ROM, an HDD, or a flash memory. Data stored in the auxiliary storage device 103 is loaded into the memory 102 as necessary.

ROM is an abbreviated name for Read Only Memory.

HDD is an abbreviated name for Hard Disk Drive.

The communication device 104 is a receiver and a transmitter. For example, the communication device 104 is a communication chip or an NIC.

NIC is an abbreviated name for Network Interface Card.

The input/output interface 105 is a port to which an input device and an output device are connected. For example, the input/output interface 105 is a USB terminal, the input device is a keyboard and a mouse, and the output device is a display.

USB is an abbreviated name for Universal Serial Bus.

The design support device 100 includes elements such as a reception unit 110, an analysis unit 120, a hardware studying unit 130, an implementation combination selection unit 140, and an output unit 150.

The analysis unit 120 includes elements such as a dataflow graph generation unit 121, a software studying unit 122, and a transfer-time calculation unit 123.

The hardware studying unit 130 includes elements such as a pattern generation unit 131 and a high-level synthesis unit 132.

These elements are realized by software.

A design support program that makes a computer work as the reception unit 110, the analysis unit 120, the hardware studying unit 130, the implementation combination selection unit 140, and the output unit 150 is stored in the auxiliary storage device 103. The design support program is loaded into the memory 102 and executed by the processor 101.

An OS is, furthermore, stored in the auxiliary storage device 103. At least a part of the OS is loaded into the memory 102 and executed by the processor 101.

The processor 101 executes the design support program while executing the OS.

OS is an abbreviated name for Operating System.

Inputted/outputted data of the design support program is stored in a storage unit 190.

The memory 102 works as the storage unit 190. A storage device such as the auxiliary storage device 103, a register in the processor 101, a cache memory in the processor 101, and the like, however, may work as the storage unit 190 instead of the memory 102 or with the memory 102.

The design support device 100 may include a plurality of processors that replace the processor 101. The plurality of processors share functionalities of the processor 101.

The design support program can be computer-readably recorded (stored) in a non-volatile recording medium such as an optical disc, the flash memory, or the like.

*Description of Operation*

A procedure of operation of the design support device 100 is equivalent to a design support method. The procedure of the operation of the design support device 100 is equivalent to a procedure of a process by the design support program.

The design support method is a method to support designing of a system configured of software and hardware.

A system that is to be a target of design will be called "target system".

Specific examples of the target system are various types of embedded systems.

Figure 2:
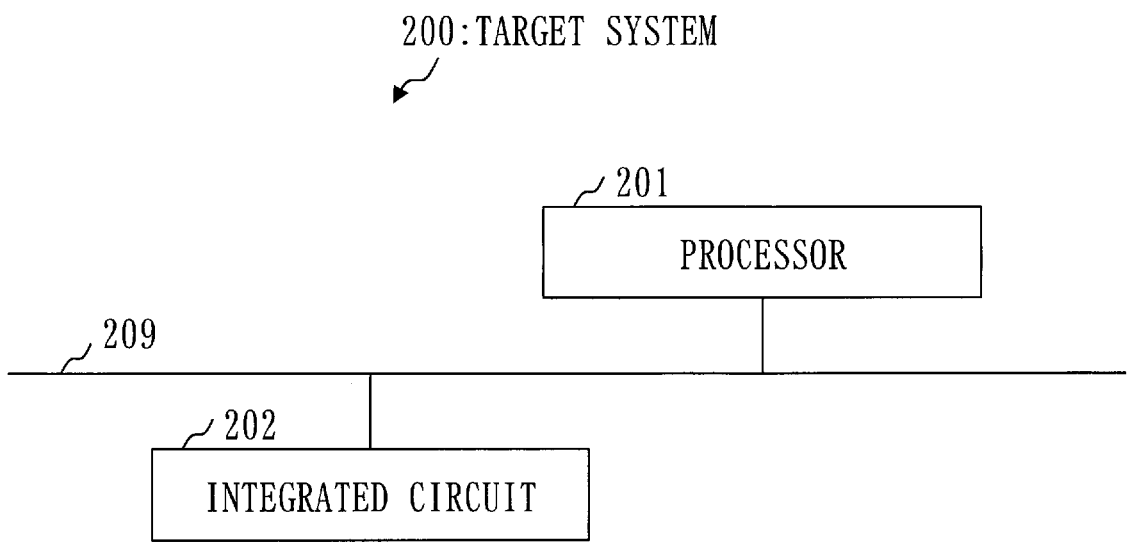
FIG. 2 is a configuration diagram of a target system 200 according to Embodiment 1.

A configuration of a target system 200 will be described based on FIG. 2.

The target system 200 includes a processor 201, an integrated circuit 202, and a bus 209.

The processor 201 is an element to implement some of functionalities of the target system 200 by software. A specific example of the processor 201 is a CPU.

The integrated circuit 202 is an element to implement some of the functionalities of the target system 200 by hardware. A specific example of the integrated circuit 202 is an FPGA. FPGA is an abbreviated name for Field Programmable Gate Array.

The processor 201 and the integrated circuit 202 communicate data via the bus 209.

A procedure of the design support method will be described based on FIG. 3.

In step S110, a user inputs a target source program into the design support device 100.

The reception unit 110 receives the target source program inputted and stores the target source program received in the storage unit 190.

The target source program is a source program in which operation of the target system is written. For example, the target source program is written in C language.

The target source program includes a plurality of functions. Each function realizes some of functionalities of the target source program.

Furthermore, the user inputs requirement data into the design support device 100.

The reception unit 110 receives the requirement data inputted and stores the requirement data received in the storage unit 190.

The requirement data is data that designates a requirement for the target system and includes a required time requirement and a circuit scale requirement.

The required time requirement is a requirement for time required for execution of a series of processes by the target system (required time).

The circuit scale requirement is a requirement for a scale of an integrated circuit (circuit scale).

In step S120, the analysis unit 120 analyzes the target source program.

Specifically, the data-flow graph generation unit 121, the software studying unit 122, and the transfer-time calculation unit 123 operate as follows based on the target source program.

The data-flow graph generation unit 121 generates a graph that illustrates a data flow with regard to the plurality of functions in the target source program. The graph to be generated is called "data-flow graph".

Specifically, the data-flow graph generation unit 121 generates an inter-function data-flow graph and an inside-function data-flow graph.

The inter-function data-flow graph illustrates a data flow between functions. For example, the inter-function data-flow graph is generated based on dependency between functions specified by an argument in each function (relationship between data input/output). Since the dependency between the functions is found by referring to the inter-function data-flow graph, execution order of each function is specified. And, two or more functions to be executed sequentially, and two or more functions to be executed in parallel are specified.

The inside-function data-flow graph illustrates a data flow inside a function. For example, the inside-function data-flow graph is generated based on dependency between processes specified by a variable of each process in a function. Since the dependency between the processes is found by referring to the inside-function data-flow graph, execution order of each process is specified. And, two or more processes to be executed sequentially, and two or more processes to be executed in parallel are specified.

For a case where each of the plurality of functions in the target source program is to be implemented by software, the software studying unit 122 calculates time required for execution of each function. The time calculated is called "software processing time".

For example, the software processing time is calculated by using a tool called profiling. A specific example of the tool is gprof.

First, the transfer-time calculation unit 123 specifies an amount of inputted/outputted data of each of the plurality of functions in the target source program. The amount of inputted/outputted data is an amount of data that is inputted or outputted. For example, the amount of inputted/outputted data is shown by the number of bits.

Then, the transfer-time calculation unit 123 calculates transfer time for the amount of inputted/outputted data of each function. The transfer time is time required for transfer of data.

For example, the transfer time is calculated by calculating a formula, "transfer time=amount of bits÷bus width÷operation frequency".

In step S130, the hardware studying unit 130 calculates hardware processing time of each function and a circuit scale of each function by a high-level synthesis for the target source program.

The hardware processing time is time required for execution of each function in a case where each function is to be implemented by hardware.

The circuit scale is a scale required for implementation of each function in a case where each function is to be implemented by hardware (circuit).

Specifically, the pattern generation unit 131 and the high-level synthesis unit 132 operate as follows.

The pattern generation unit 131 generates a plurality of hardware implementation patterns based on the data-flow graph.

The hardware implementation pattern is a pattern where each function in the target source program is implemented by hardware.

Each hardware implementation pattern is used as a parameter for the high-level synthesis. For example, each hardware implementation pattern is designated using an option of a high-level synthesis tool.

For example, the pattern generation unit 131 generates each hardware implementation pattern as follows.

The pattern generation unit 131 searches, based on the inter-function data-flow graph, for two or more functions with which the hardware processing time will be shortened by being merged. Then, the pattern generation unit 131 generates a hardware implementation pattern where two or more functions found are merged. "Merging of functions" will be described later.

The pattern generation unit 131 searches, among the plurality of processes in each function, for two or more processes with which the hardware processing time will be shortened by being pipelined based on the inside-function data-flow graph of each function. Then, the pattern generation unit 131 generates a hardware implementation pattern where two or more processes found are pipelined. "Pipelining" will be described later.

The pattern generation unit 131 searches, among the plurality of processes in each function, for two or more processes with which the hardware processing time will be shortened by being parallelized based on the inside-function data-flow graph of each function. Then, the pattern generation unit 131 generates a hardware implementation pattern where two or more processes found are parallelized. "Parallelization" will be described later.

The pattern generation unit 131 searches for two or more calculations of a same type among a plurality of calculations in each function based on a source program of each function in the target source program. Then, the pattern generation unit 131 rewrites the source program of each function in the target source program to merge two or more calculations found into one calculation. By the above, sharing of a calculation circuit is made possible. "Circuit sharing" will be described later.

The high-level synthesis unit 132 performs the high-level synthesis for the target source program according to each hardware implementation pattern.

By the above, hardware processing time of each function in each hardware implementation pattern and a circuit scale of each function in each hardware implementation pattern are calculated.

In step S140, the implementation combination selection unit 140 selects an implementation combination based on various types of data.

The various types of data are the software processing time of each function, the hardware processing time of each function in each hardware implementation pattern, the circuit scale of each function in each hardware implementation pattern, and the data-flow graph.

The implementation combination is a combination of one or more functions to be implemented by software and one or more functions to be implemented by hardware.

Specifically, the implementation combination selection unit 140 selects an implementation combination that satisfies the required time requirement and the circuit scale requirement. The implementation combination to be selected is called "suitable combination".

The suitable combination can be selected, for example, using linear programming.

The implementation combination that satisfies the required time requirement is specified as follows.

First, the implementation combination selection unit 140 specifies, based on the inter-function data-flow graph, for every implementation combination, two or more functions to be executed sequentially, and two or more functions to be executed in parallel.

In a case where the implementation is done by software, it is possible to implement functions in parallel in number less than or equal to the number of processors (cores) included in the target system. It is, however, not possible to implement functions in parallel in number exceeding the number of processors (cores) included in the target system. For example, in a case where the processor included in the target system is a single core processor, two or more functions to be implemented by software are not possible to be implemented in parallel.

In a case where the implementation is done by hardware, two or more functions are possible to be implemented in parallel.

Next, the implementation combination selection unit 140 generates, for every implementation combination, execution time-slot data based on a specified result, the software processing time of each function, and the hardware processing time of each function in each hardware implementation pattern.

The execution time-slot data indicates a time-slot in which each function is executed. Two or more functions to be executed sequentially are executed in different time-slots. Two or more functions to be executed in parallel are executed in a same time-slot.

The time-slot in which each function is executed is calculated taking into consideration time required for data transfer between two functions to be executed consecutively (data transfer time). That is, timing when the data transfer time has passed after completion of execution of a previous function, execution of the latter function is started.

For example, the implementation combination selection unit 140 specifies execution order of the plurality of functions based on the inter-function data-flow graph. Then, the implementation combination selection unit 140 specifies the data transfer time between the functions for every set of functions formed of two functions to be executed consecutively.

In a case where both of the two functions are to be implemented by software, the data transfer time can be considered to be zero. As the data transfer time in this case, however, time other than zero may be set.

In a case where both of the two functions are to be implemented by hardware, the data transfer time can be considered to be zero. As the data transfer time in this case, however, time other than zero may be set.

In a case where one of the two functions is to be implemented by software and another of the two functions is to be implemented by hardware, the data transfer time is specified based on transfer time of each of the two functions. For example, transfer time for an amount of outputted data of the former function or transfer time for an amount of inputted data of the latter function can be considered to be the data transfer time.

Then, the implementation combination selection unit 140 selects, based on the execution time-slot data of each implementation combination, an implementation combination that satisfies the required time requirement.

For example, the implementation combination selection unit 140 calculates required time of each implementation combination based on the execution time-slot data of each implementation combination. A length of an entire time-slot that the execution time-slot data of each implementation combination indicates becomes the required time of each implementation combination. Then, the implementation combination selection unit 140 verifies, for every implementation combination, whether or not the required time of the implementation combination satisfies the required time requirement. In a case where the required time of the implementation combination satisfies the required time requirement, the implementation combination satisfies the required time requirement.

The implementation combination that satisfies the circuit scale requirement is specified as follows.

First, the implementation combination selection unit 140 calculates a circuit scale of the implementation combination.

For example, the implementation combination selection unit 140 calculates a total of one or more circuit scales corresponding to one or more functions to be implemented by hardware. The total calculated is the circuit scale of the implementation combination.

Then, the implementation combination selection unit 140 verifies whether or not the circuit scale of the implementation combination satisfies the circuit scale requirement.

In a case where the circuit scale of the implementation combination satisfies the circuit scale requirement, the implementation combination satisfies the circuit scale requirement.

In a case where the suitable combinations exist in plurality, the implementation combination selection unit 140 selects a suitable combination that is optimal based on at least one of required time of each suitable combination and a circuit scale of each suitable combination.

For example, the implementation combination selection unit 140 selects a suitable combination with required time that is shortest or a suitable combination with a circuit scale that is smallest.

In step S150, the output unit 150 outputs the suitable combination selected.

For example, the output unit 150 displays the suitable combination on a display.

Hereinafter, with regard to step S130 of FIG. 3, "parallelization", "pipelining", "circuit sharing", and "merging of functions" will be described.

First, "parallelization" will be described.

Parallelization is an architecture in a function. A process is speeded up and processing time is shortened by parallelization.

By a plurality of processes that are executed serially being executed in parallel, processing time is shortened according to the number of processes executed in parallel.

An example of loop processing is illustrated in FIG. 4.

Expression (1) is executed repeatedly one hundred times. Expression (1) of each execution is independent. For example, there is no dependency between "A[0]=B[0]+C[0]" that is expression (1) when "i=0", and "A[1]=B[1]+C[1]" that is expression (1) when "i=1".

An option (unroll times) can be set in the high-level synthesis tool by designating the number of loop unrolling (the number of loops). Then, by the high-level synthesis tool being executed, RTL according to the number of loops designated is generated. RTL is an abbreviated name for Register-Transfer Level.

As the number of loops increases, the number of parallel processing increases, and processing time is shortened.

Next, "pipelining" will be described.

Pipelining is an architecture in a function. A process is speeded up and processing time is shortened by pipelining.

By a series process of next time being started before a series of process are completed, throughput is improved. Specifically, in a series of processes, when each process is completed, each process of next time is started.

Figure 5:
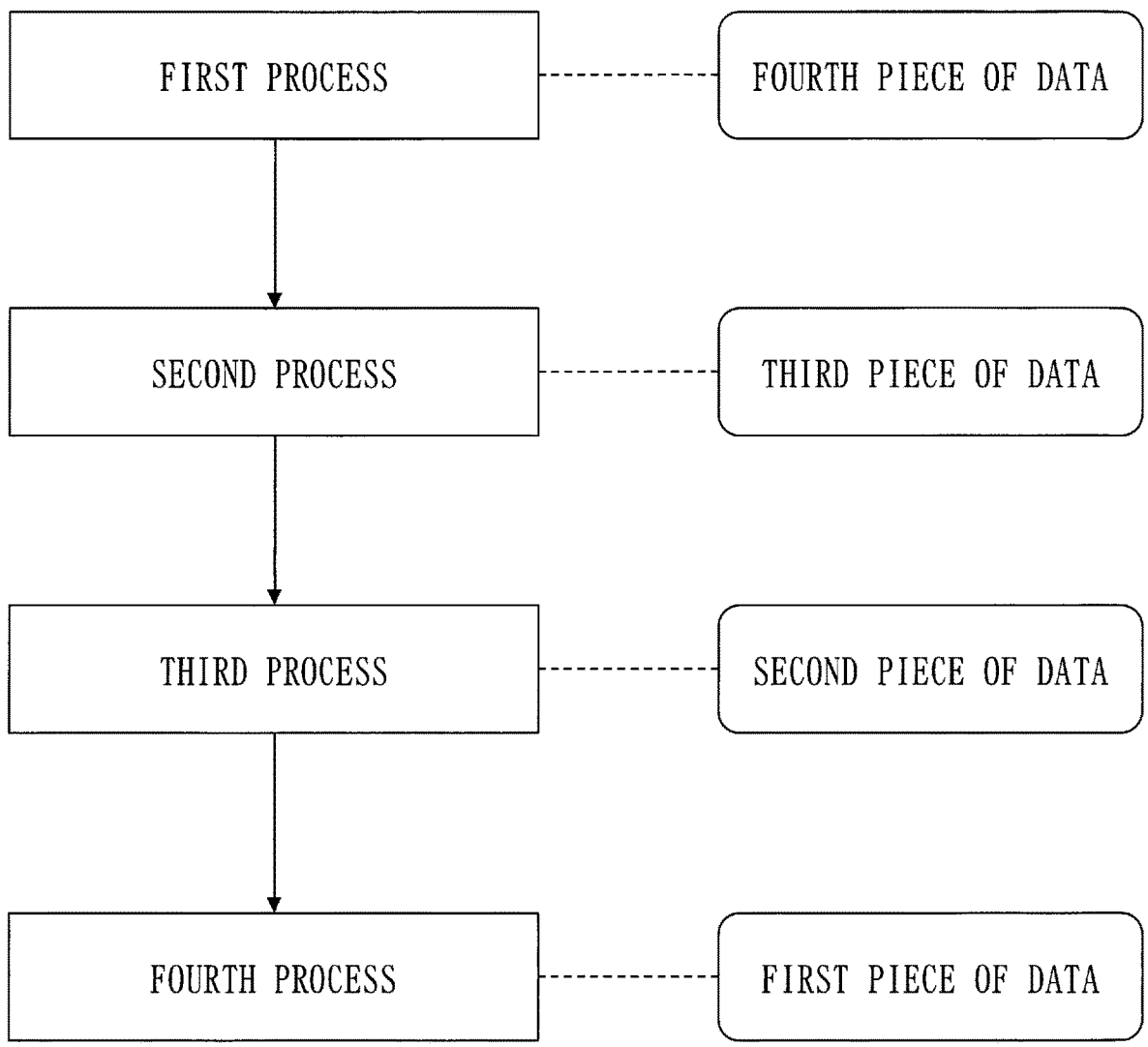
FIG. 5 is a diagram illustrating a series of pipelined processes according to Embodiment 1.

A series of pipelined processes are illustrated in FIG. 5.

In the series of processes, each process is executed in order of a first process, a second process, a third process, and a fourth process. By the series of processes, each piece of data is processed in order of first piece of data, second piece of data, third piece of data, and fourth piece of data.

In a case where the series of processes are not pipelined (illustration omitted), a series of processes for the second piece of data are executed after a series of processes for the first piece of data are completed.

In a case where the series of processes are pipelined (refer to FIG. 5), during when the fourth process for the first piece of data is executed, the third process for the second piece of data is executed, the second process for the third piece of data is executed, and the first process for the fourth piece of data is executed. By the above, the throughput is improved.

Next, "circuit sharing" will be described.

Circuit sharing is an architecture in a function. By circuit sharing, the calculation circuit is shared among the plurality of calculations that are of the same type, and the circuit scale is reduced.

Figure 6:
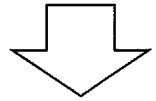
FIG. 6 is a diagram illustrating an example of a source program according to Embodiment 1.

An example of a source program before and after a change for circuit sharing is illustrated in FIG. 6.

Source program (1) is the source program before the change.

Two loop processes are included in source program (1). Loop processing based on variable i will be called loop processing (i), and loop processing based on variable j will be called loop processing (j).

Calculation A and calculation X are executed repeatedly in loop processing (i).

Calculation A and calculation Y are executed repeatedly in loop processing (j).

Calculation A is written in two places in source program (1).

Source program (2) is the source program after the change.

One loop process is included in source program (2). This loop process is of loop processing (i) and loop processing (j) merged. In the loop process of each execution, after calculation A is executed, the calculation of either calculation X or calculation Y that is selected based on a value of variable x is executed.

Calculation A is written in one place in source program (2).

By converting source program (1) to source program (2), sharing the calculation circuit for calculation A of loop processing (i) and calculation A of loop processing (j) will be possible.

The high-level synthesis tool is used for circuit sharing.

An option can be set by designating whether or not sharing of each calculator is necessary and whether or not sharing of each register is necessary in the high-level synthesis tool. The calculator and the register are elements that configure the calculation circuit.

Next, "merging of functions" will be described.

Merging of functions is an architecture that extends over the plurality of functions, that is, an architecture that is among functions. A process is speeded up and processing time is shortened by merging of functions.

Specifically, the processing time is shortened by the plurality of processes in the plurality of functions being pipelined after the plurality of functions are merged into one function.

Figure 7:
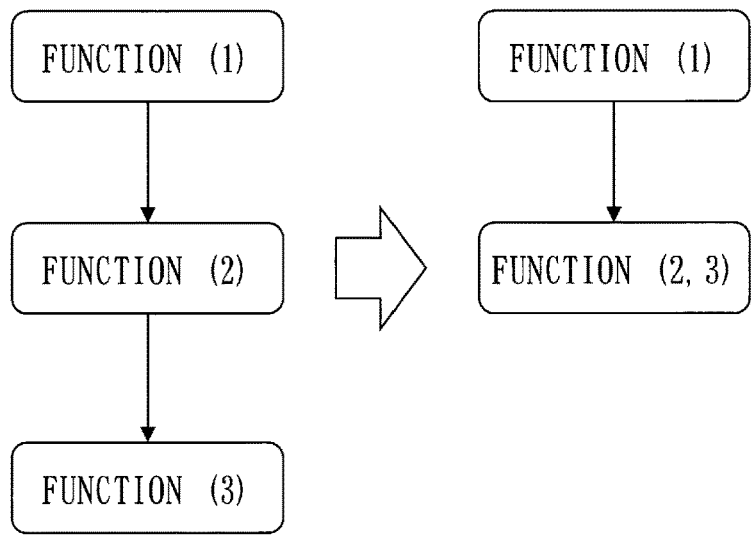
FIG. 7 is a diagram illustrating an example of merging of functions according to Embodiment 1.

An example of merging of functions is illustrated in FIG. 7.

Before merging of functions, function (2) is executed after function (1), and function (3) is executed after function (2).

In a case where function (2) and function (3) are merged into function (2, 3), function (2, 3) is executed after function (1).

Figure 8:
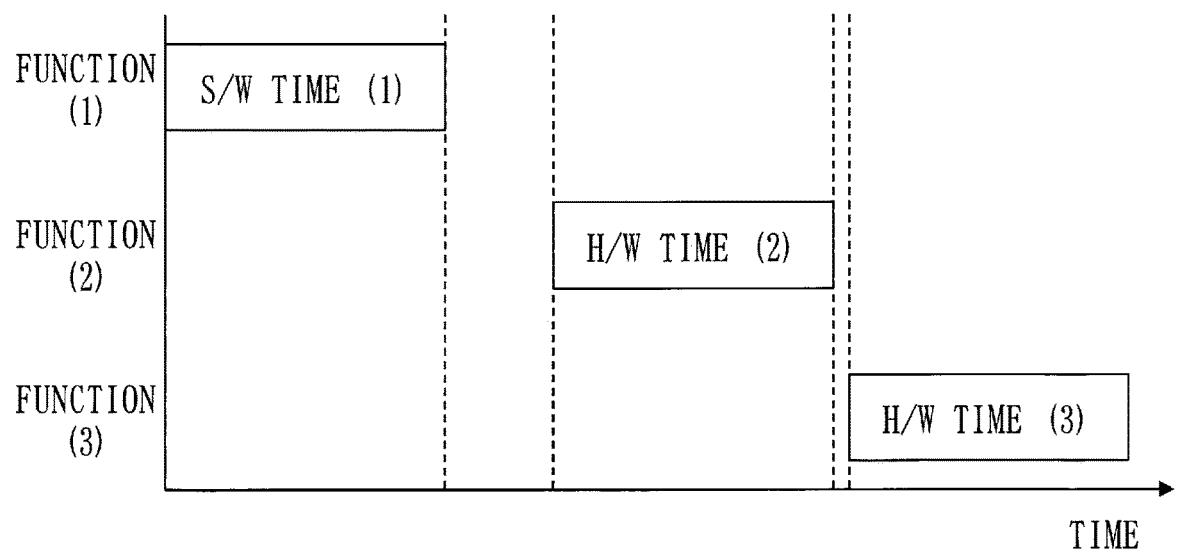
FIG. 8 illustrates a timing chart before merging of functions according to Embodiment 1.

A timing chart before merging of functions is illustrated in FIG. 8.

S/W time (1) is processing time of function (1) in a case where function (1) is implemented by software.

H/W time (2) is processing time of function (2) in a case where function (2) is implemented by hardware.

H/W time (3) is processing time of function (3) in a case where function (3) is implemented by hardware.

Intervals between the processing time represent data transfer time between the functions.

Figure 9:
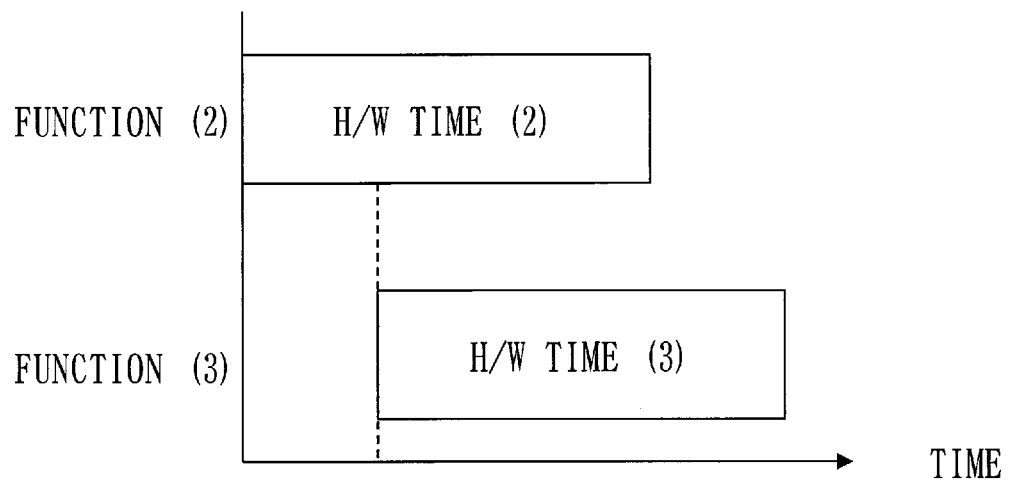
FIG. 9 illustrates processing time after merging of functions according to Embodiment 1.

Processing time in a case where function (2) and function (3) are merged is illustrated in FIG. 9.

In a case where a process of function (3) can be started before a process of function (2) is completed, the processing time of function (2) and function (3) can be shortened by merging function (2) and function (3).

Figure 10:
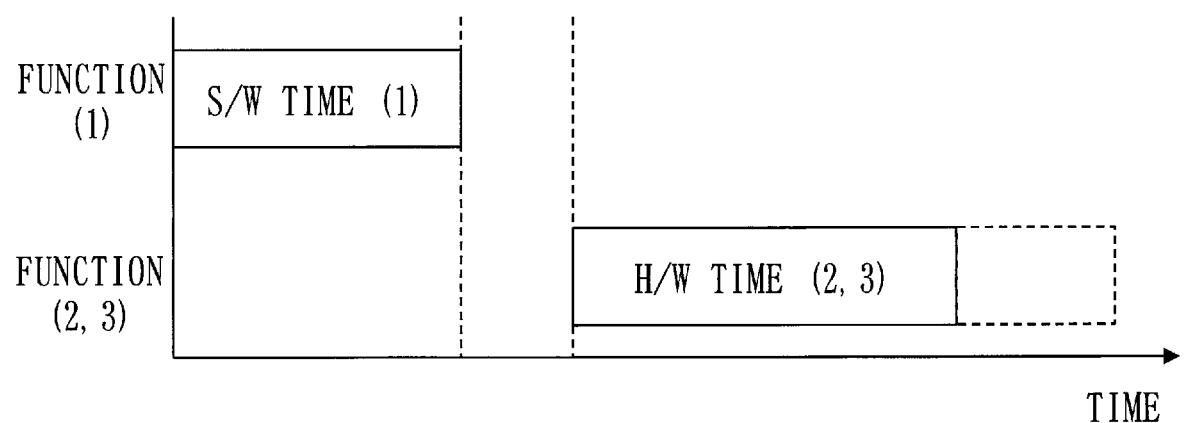
FIG. 10 illustrates a timing chart after merging of functions according to Embodiment 1.

A timing chart after merging of functions is illustrated in FIG. 10.

H/W time (2, 3) is processing time of function (2, 3) in a case where function (2) and function (3) are merged.

Required time of function (1), function (2), and function (3) are shortened by function (2) and function (3) being merged. A dashed line rectangle represents time that is shortened.

Figure 11:
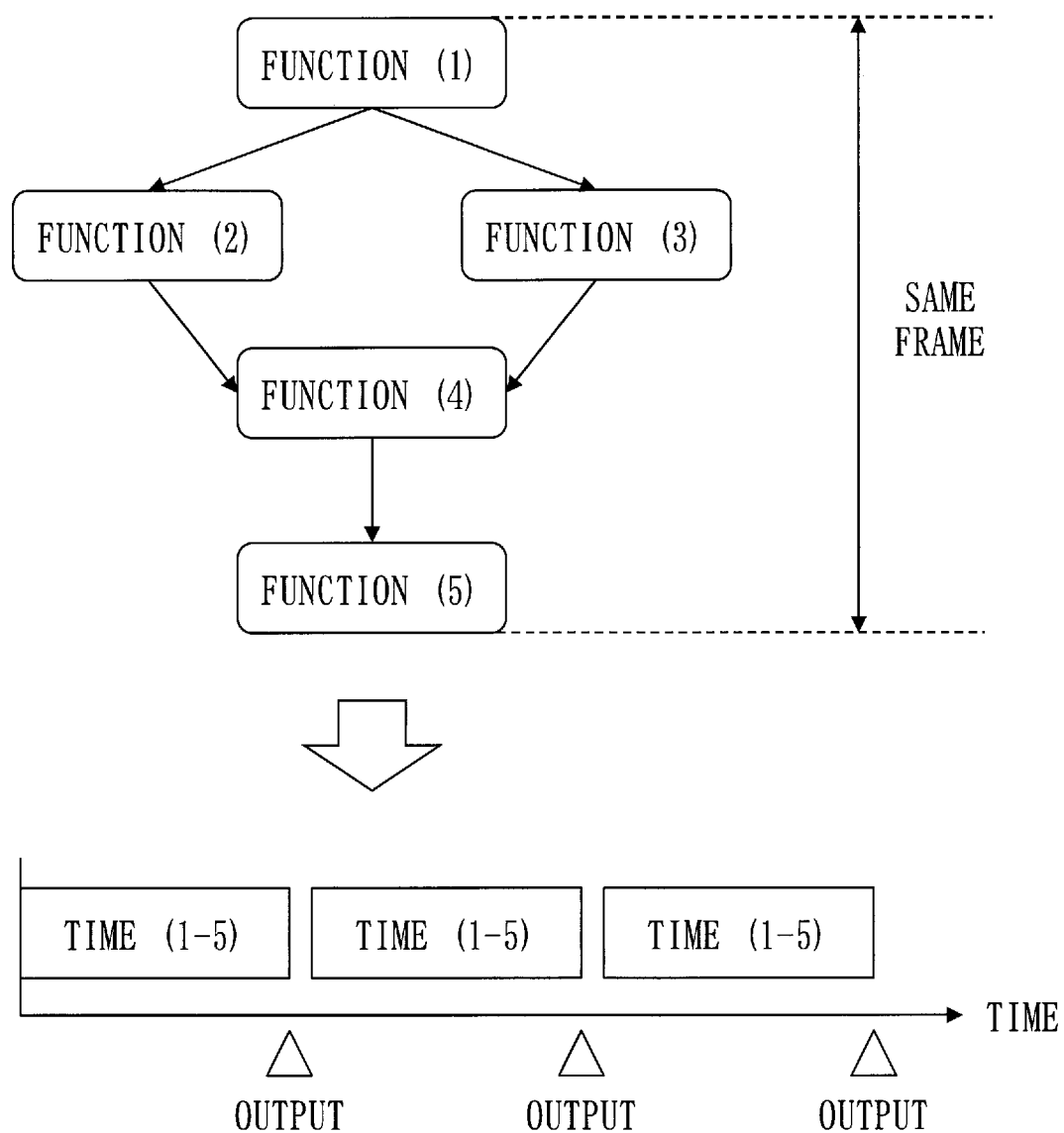
FIG. 11 is a diagram illustrating an example of a throughput improvement (before an improvement) according to Embodiment 1.

Examples of a throughput improvement are illustrated in FIG. 11 and FIG. 12.

A series of processes are executed by five functions from function (1) to function (5).

Time (1-5) is time required for a series of processes for one frame (required time).

In a case where a series of processes for a next frame are started after a series of processes for a frame are completed (refer to FIG. 11), required time for series of processes for three frames becomes more than or equal to time (1-5) tripled.

In a case where a series of processes for a next frame are started before a series of processes for a frame are completed (refer to FIG. 12), required time for series of processes for three frames becomes less than time (1-5) tripled.

In FIG. 12, when a process for frame (X) is started by function (4), a process for frame (X+1) is started by function (1).

Figure 13:
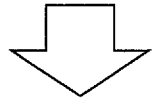
FIG. 13 is a diagram illustrating an example of a throughput improvement according to Embodiment 1.

An example of a throughput improvement is illustrated in FIG. 13.

Suppose that throughput of each of function (1) to function (5) is 30 fps. Fps means the number of frames processed per second.

Suppose that function (3) and function (4) are merged into function (3, 4). Suppose that throughput of function (3, 4) is 30 fps. In this case, the number of stages of a pipeline is reduced and throughput of function (1) to function (5) as a whole is improved. The throughput that is improved is time equivalent to 30 fps.

*Effect of Embodiment 1.*

A S/W-H/W division that is optimal can be performed automatically by Embodiment 1. That is, an implementation combination that satisfies the requirement of the target system can be selected automatically.

Consequently, a person without experience of H/W design or S/W design can obtain an appropriate implementation combination.

For the plurality of functions in the target source program, the design support system 100S calculates the software processing time of each function, the transfer time of each function, the hardware processing time of each function, and the circuit scale of each function. Then, the design support system 100S selects an implementation combination using the data-flow graph in addition to these pieces of information. The data-flow graph clarifies dependency between the functions (or between the processes).

Thus, presenting an appropriate implementation combination that is based on the dependency between the functions (or between the processes) becomes possible.

Embodiment 2

Figure 14:
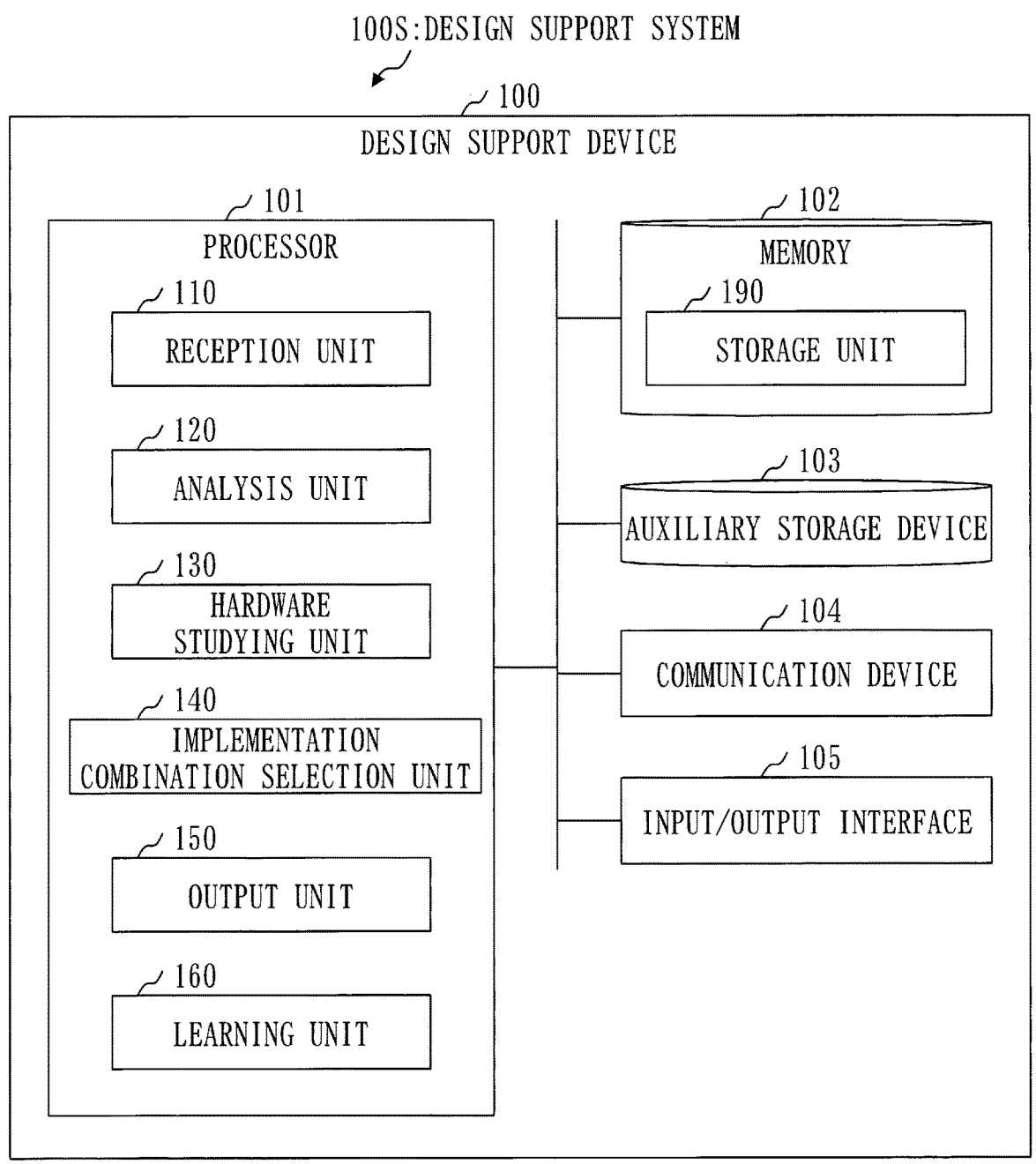
FIG. 14 is a configuration diagram of a design support system 100S according to Embodiment 2.
Figure 15:
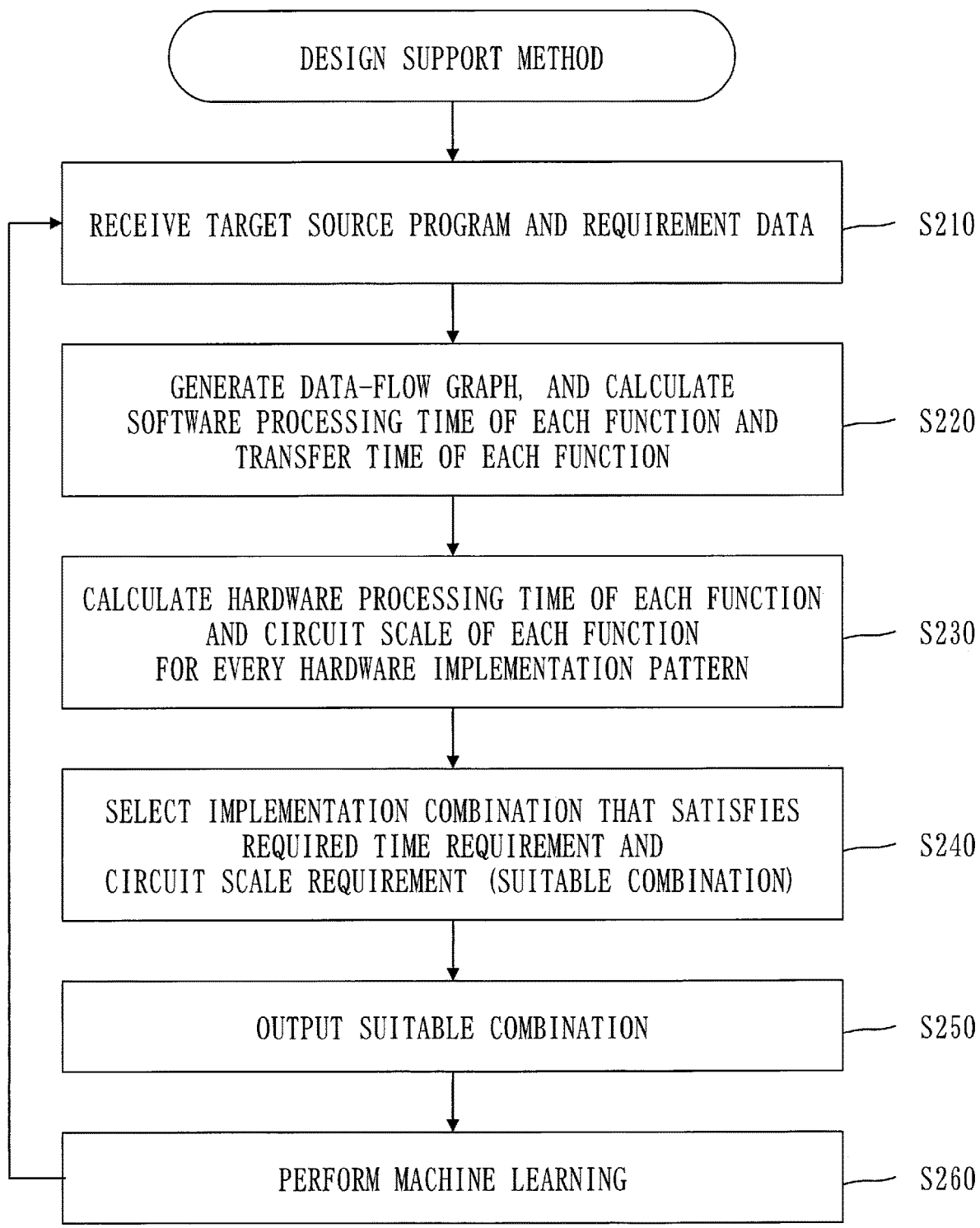
FIG. 15 is a flowchart of a design support method according to Embodiment 2.

With regard to a form of learning a selection result of an implementation combination, differing points from Embodiment 1 will mainly be described based on FIG. 14 and FIG. 15.

*Description of Configuration*

A configuration of the design support device 100 will be described based on FIG. 14.

The design support device 100 further includes a learning unit 160.

The design support program, further, makes a computer work as the learning unit 160.

*Description of Operation*

A procedure of the design support method will be described based on FIG. 15.

Step S210 to step S230 are same as step S110 to step S130 in Embodiment 1.

In step S240, the implementation combination selection unit 140 selects an implementation combination (a suitable combination) that satisfies the required time requirement and the circuit scale requirement.

Step S240 is equivalent to step S140 in Embodiment 1. A part of step S240, however, is different from step S140 in Embodiment 1.

First, the implementation combination selection unit 140 specifies one or more implementation combinations that are to be candidates for an implementation combination for the plurality of functions in the target source program by executing a learning model.

The learning model has a functionality to specify one or more implementation combinations that are to be candidates for an implementation combination to be selected. The learning model is realized by software, hardware, or a combination of these. The learning model is also called a learner or a learning module.

For example, the implementation combination selection unit 140 executes the learning model with the information (the source program, the data-flow graph, or the like) on each of the plurality of functions in the target source program as input. By the above, one or more implementation combinations are outputted from the learning model. One or more implementation combinations outputted are one or more implementation combinations specified as candidates for an implementation combination for the plurality of functions in the target source program.

Then, the implementation combination selection unit 140 selects an implementation combination (a suitable combination) for the plurality of functions in the target source program from one or more implementation combinations specified. A selection method is same as the method in step S140 of Embodiment 1.

Step S250 is same as step S150 in Embodiment 1.

In step S260, the learning unit 160 performs machine learning on the implementation combination selected in step S240. By the above, the learning model is updated.

For example, the implementation combination selection unit 140 performs machine learning with the information (the source program, the data-flow graph, or the like) on each of the plurality of functions in the target source program, and information on the implementation combination selected as input. By the above, the learning model is updated.

The process proceeds to step S210 after step S260.

Then, step S210 to step S260 are executed for a new target source program. A plurality of functions in the new target source program are called a plurality of new functions.

By the above, an implementation combination (a suitable combination) for the plurality of new functions is selected.

*Effect of Embodiment 2.*

By Embodiment 2, a learning model can be obtained by performing machine learning on the selection result of the implementation combination. And, candidates for an implementation combination can be limited by the learning model.

A suitable combination is selected from the candidates that have been limited. Consequently, a load of the design support system 100S is reduced. Time from inputting of the target source program to outputting of the suitable combination is shortened.

*Supplement to Embodiments*

Figure 16:
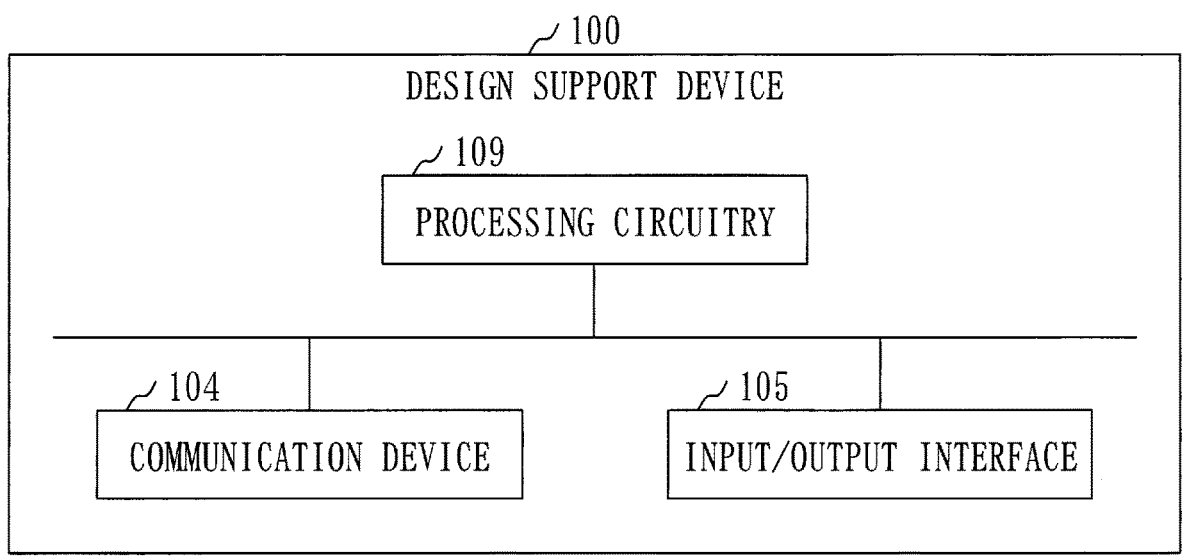
FIG. 16 is a hardware configuration diagram of a design support device 100 according to each embodiment.

A hardware configuration of the design support device 100 will be described based on FIG. 16.

The design support device 100 includes processing circuitry 109.

The processing circuitry 109 is hardware that realizes the reception unit 110, the analysis unit 120, the hardware studying unit 130, the implementation combination selection unit 140, the output unit 150, and the learning unit 160.

The processing circuitry 109 may be dedicated hardware or may be the processor 101 that executes a program stored in the memory 102.

In a case where the processing circuitry 109 is dedicated hardware, the processing circuitry 109 is, for example, a single circuit, a composite circuit, a programmed processor, a parallel programmed processor, an ASIC, an FPGA, or a combination of these.

ASIC is an abbreviated name for Application Specific Integrated Circuit.

FPGA is an abbreviated name for Field Programmable Gate Array.

The design support device 100 may include a plurality of processing circuits that replace the processing circuitry 109. The plurality of processing circuits share functionalities of the processing circuitry 109.

In the processing circuitry 109, some of the functionalities may be realized by dedicated hardware and the rest of the functionalities may be realized by software or firmware.

As described, each functionality of the design support device 100 can be realized by hardware, software, firmware, or a combination of these.

"Unit", which is an element of the design support device 100 may be replaced with "process" or "step".

Each embodiment is an example of a preferred mode, and is not intended to limit the technical scope of the present invention. Each embodiment may be executed partially or may be executed being combined with other modes. The procedures described using the flowcharts and the like may be changed as appropriate.

REFERENCE SIGNS LIST

100: design support device; 100S: design support system; 101: processor; 102: memory; 103: auxiliary storage device; 104: communication device; 105: input/output interface; 109: processing circuitry; 110: reception unit; 120: analysis unit; 121: data-flow graph generation unit; 122: software studying unit; 123: transfer-time calculation unit; 130: hardware studying unit; 131: pattern generation unit; 132: high-level synthesis unit; 140: implementation combination selection unit; 150: output unit; 160: learning unit; 190: storage unit; 200: target system; 201: processor; 202: integrated circuit; 209: bus.

The invention claimed is:

1. A design support system comprising:
processing circuitry to:
for a case where each of a plurality of functions in a target source program is to be implemented by software, calculate software processing time required for execution of each function,
generate, based on the target source program, an inter-function data-flow graph that illustrates a data flow between the functions in the plurality of functions,
calculate, for a plurality of hardware implementation patterns where each function is implemented by hardware, hardware processing time required for execution of each hardware implementation pattern and a circuit scale required for implementation of each hardware implementation pattern by a high-level synthesis for the target source program, and
select, based on the software processing time of each function, the hardware processing time of each function, the circuit scale of each function, and the inter-function data-flow graph, an implementation combination of one or more functions to be implemented by software and one or more functions to be implemented by hardware, wherein
the processing circuitry searches, based on the inter-function data-flow graph, for two or more functions with which the hardware processing time will be shortened by being merged into a single function, generates a hardware implementation pattern where two or more functions found are merged, and calculates, by performing the high-level synthesis for the target source program according to each hardware implementation pattern, hardware processing time of each function in each hardware implementation pattern and a circuit scale of each function in each hardware implementation pattern.

2. The design support system according to claim 1,
wherein the processing circuitry
updates a learning model that specifies one or more implementation combinations that are to be candidates for an implementation combination to be selected by performing machine learning on an implementation combination selected for the plurality of functions in the target source program, and
specifies one or more implementation combinations that are to be candidates for an implementation combination for a plurality of new functions in a new target source program by executing the learning model, and selects an implementation combination for the plurality of new functions from one or more implementation combinations specified.

3. A design support system comprising:
processing circuitry to:
for a case where each of a plurality of functions in a target source program is to be implemented by software, calculate software processing time required for execution of each function,
generate, based on the target source program, an inter-function data-flow graph that illustrates a data flow between the functions in the plurality of functions,
calculate, for a plurality of hardware implementation patterns where each function is implemented by hardware, hardware processing time required for execution of each hardware implementation pattern and a circuit scale required for implementation of each hardware implementation pattern by a high-level synthesis for the target source program, and
select, based on the software processing time of each function, the hardware processing time of each function, the circuit scale of each function, and the inter-function data-flow graph, an implementation combination of one or more functions to be implemented by software and one or more functions to be implemented by hardware, wherein
the processing circuitry
specifies order of execution of the plurality of functions based on the inter-function data-flow graph,
specifies, based on the inter-function data-flow graph, for every implementation combination, two or more functions to be executed sequentially, and two or more functions to be executed in parallel,
generates, based on a specified result, the software processing time of each function, and the hardware processing time of each function in each hardware implementation pattern, for every implementation combination, execution time-slot data that indicates a time-slot in which each function is executed,
selects, based on the execution time-slot data of each implementation combination, an implementation combination that satisfies a required time requirement that is a requirement for required time, while taking into consideration data transfer time that is time required for data transfer between two functions to be executed consecutively, and
selects an implementation combination that satisfies a circuit scale requirement that is a requirement for the circuit scale.

4. The design support system according to claim 3,
wherein the processing circuitry specifies an amount of inputted/outputted data of each function based on the target source program and to calculate transfer time for the amount of inputted/outputted data of each function, and specifies the data transfer time based on the transfer time of each of the two functions.

5. The design support system according to claim 4, wherein the processing circuitry updates a learning model that specifies one or more implementation combinations that are to be candidates for an implementation combination to be selected by performing machine learning on an implementation combination selected for the plurality of functions in the target source program, and specifies one or more implementation combinations that are to be candidates for an implementation combination for a plurality of new functions in a new target source program by executing the learning model, and selects an implementation combination for the plurality of new functions from one or more implementation combinations specified.

6. The design support system according to claim 3, wherein the processing circuitry updates a learning model that specifies one or more implementation combinations that are to be candidates for an implementation combination to be selected by performing machine learning on an implementation combination selected for the plurality of functions in the target source program, and specifies one or more implementation combinations that are to be candidates for an implementation combination for a plurality of new functions in a new target source program by executing the learning model, and selects an implementation combination for the plurality of new functions from one or more implementation combinations specified.

7. The design support system according to claim 3, wherein the processing circuitry updates a learning model that specifies one or more implementation combinations that are to be candidates for an implementation combination to be selected by performing machine learning on an implementation combination selected for the plurality of functions in the target source program, and specifies one or more implementation combinations that are to be candidates for an implementation combination for a plurality of new functions in a new target source program by executing the learning model, and selects an implementation combination for the plurality of new functions from one or more implementation combinations specified.

8. A non-transitory computer readable medium storing a design support program for making a computer execute:

a software studying process, for a case where each of a plurality of functions in a target source program is to be implemented by software, to calculate software processing time required for execution of each function;

a data-flow graph generation process to generate, based on the target source program, an inter-function data-flow graph that illustrates a data flow between the functions in the plurality of functions;

a hardware studying process to calculate, for a plurality of hardware implementation patterns where each function is implemented by hardware, hardware processing time required for execution of each hardware implementation pattern and a circuit scale required for implementation of each hardware implementation pattern by a high-level synthesis for the target source program; and an implementation combination selection process to select, based on the software processing time of each function, the hardware processing time of each function, the circuit scale of each function, and the inter-function data-flow graph, an implementation combination of one or more functions to be implemented by software and one or more functions to be implemented by hardware, wherein the hardware studying process searches, based on the inter-function data-flow graph, for two or more functions with which the hardware processing time will be shortened by being merged into a single function, generates a hardware implementation pattern where two or more functions found are merged, and calculates, by performing the high-level synthesis for the target source program according to each hardware implementation pattern, hardware processing time of each function in each hardware implementation pattern and a circuit scale of each function in each hardware implementation pattern.

9. A non-transitory computer readable medium storing a design support program for making a computer execute:

a software studying process, for a case where each of a plurality of functions in a target source program is to be implemented by software, to calculate software processing time required for execution of each function;

a data-flow graph generation process to generate, based on the target source program, an inter-function data-flow graph that illustrates a data flow between the functions in the plurality of functions;

a hardware studying process to calculate, for a plurality of hardware implementation patterns where each function is implemented by hardware, hardware processing time required for execution of each hardware implementation pattern and a circuit scale required for implementation of each hardware implementation pattern by a high-level synthesis for the target source program; and an implementation combination selection process to select, based on the software processing time of each function, the hardware processing time of each function, the circuit scale of each function, and the inter-function data-flow graph, an implementation combination of one or more functions to be implemented by software and one or more functions to be implemented by hardware, wherein the implementation combination selection process specifies order of execution of the plurality of functions based on the inter-function data-flow graph, specifies, based on the inter-function data-flow graph, for every implementation combination, two or more functions to be executed sequentially, and two or more functions to be executed in parallel, generates, based on a specified result, the software processing time of each function, and the hardware processing time of each function in each hardware implementation pattern, for every implementation combination, execution time-slot data that indicates a time-slot in which each function is executed, selects, based on the execution time-slot data of each implementation combination, an implementation combination that satisfies a required time requirement that is a requirement for required time, while taking into consideration data transfer time that is time required for data transfer between two functions to be executed consecutively, and selects an implementation combination that satisfies a circuit scale requirement that is a requirement for the circuit scale.

\* \* \* \* \*